E. STIGLEMAN.
AUTOMOBILE LOCK.
APPLICATION FILED NOV. 4, 1918.
1,293,236.
Patented Feb. 4, 1919.
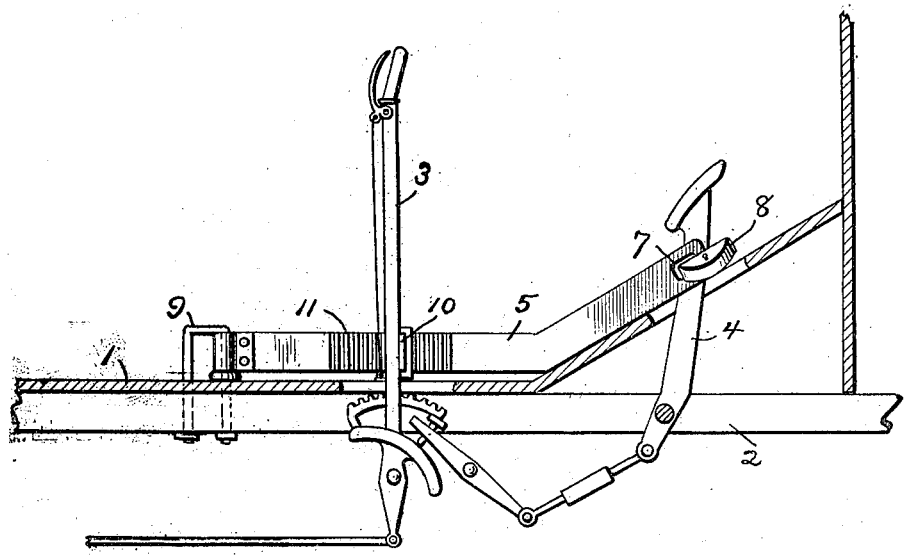
FIG. 1.
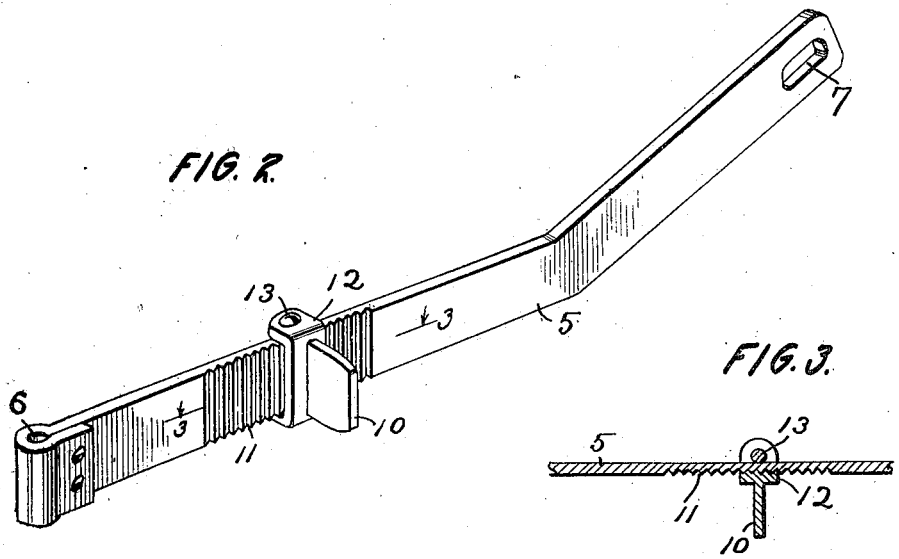
FIG. 2.
FIG. 3.
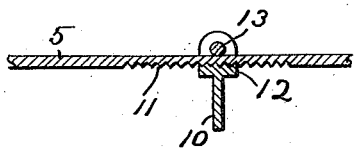
Witnesses
W. C. Fielding
U. B. Hillyard
Inventor
Everett Stigleman
By Richard B. Owen
Attorney

UNITED STATES PATENT OFFICE.

EVERETT STIGLEMAN, OF RICHMOND, INDIANA.

AUTOMOBILE-LOCK.

1,293,236.  Specification of Letters Patent.  Patented Feb. 4, 1919.

Application filed November 4, 1918. Serial No. 261,032.

*To all whom it may concern:*

Be it known that I, EVERETT STIGLEMAN, a citizen of the United States, residing at Richmond, in the county of Wayne and State of Indiana, have invented certain new and useful Improvements in Automobile-Locks, of which the following is a specification.

This invention has for its object to provide novel means for preventing the appropriation of a motor vehicle, such as an automobile by any unauthorized party, either by moving the machine under the power of its own motor or by dragging the same off by extraneous power.

The invention provides means for locking the brake when set, thereby preventing turning of the wheels as well as locking the clutch lever to prevent its operation to throw the driving mechanism into gear.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the accompanying drawing, Figure 1 is a detail view of a portion of a motor vehicle showing the brake and clutch levers and the improved locking device in coöperative relation therewith.

Fig. 2 is a perspective view of the locking device.

Fig. 3 is a sectional detail on the line 3—3 of Fig. 2.

Corresponding and like parts are referred to in the following description and indicated in the views of the drawing by like reference characters.

The numeral 1 designates the floor of a motor vehicle and 2 a supporting bar of the chassis. The brake lever 3 may be of any desired construction and arrangement. The numeral 4 designates a clutch lever such as generally provided to be operated by the foot. The levers 3 and 4 may be of any relative arrangement depending upon the make and type of machine of which they form a part.

The locking device is indicated at 5 and consists of a bar having an eye 6 at one end and a slot 7 at the opposite end to receive the hasp or bow of a pad lock 8. The eye 6 may be provided in any manner and as shown is formed by bending an end portion of the bar upon itself, the bent end being secured by suitable fastenings. The forward end of the bar 5 is inclined to conform to the inclination of the forward portion of the floor 1. Obviously the shape of the bar will conform to the floor of the vehicle so as to lie close thereon. The bar 5 is pivoted at the end provided with the eye 6 so as to swing laterally at the end formed with the slot 7. A suitable shackle or clip 9 is secured to the floor 1 and frame work of the vehicle and a leg or member passes through the eye 6 and serves to pivotally connect the bar 5 to the vehicle.

A stop 10 projects laterally from the bar 5 into the path of the brake lever 3 to prevent movement thereof in one direction. To adapt the stop 10 for the various relative positions of the lever 3 it is adjustably connected with the bar 5. To secure the stop in the adjusted position the bar 5 is provided upon one of its sides or faces with a plurality of teeth 11. The stop 10 is provided at its inner end with a clip 12, the ends of which overlap the top and bottom edges of the bar 5 and are apertured to receive a bolt or fastening 13. The inner face of the clip 12 is toothed to match the teeth 11 of the bar 5 and thereby prevent possible displacement of the stop 10 after it has been moved to the required adjusted position. In the present instance the stop is disposed to engage the forward edge of the lever 3 after the latter has been moved to set the brake, thereby preventing surreptitious release of the brake by an unauthorized party.

When installing a locking device in accordance with the present invention the bar 5 is pivoted at its rear end to the vehicle in such position that when the clutch lever 4 is in neutral position, that is with the clutch disconnected, the slotted end 7 of the bar will occupy a position to receive the bow or hasp of the pad lock when the latter is adjusted so as to engage the lever 4. The stop 10 is adjusted on the bar 5 so that when the upper end of the brake lever 3 is drawn rearward and the brakes are firmly set the stop 10 will extend in front of the lever 3 and prevent release of the brake.

The stop 10 is adjusted on the toothed portion 11 of the bar 5 and when in proper position the bolt or fastening 13 is applied to the clip, the bar 5 being held between the fastening 13 and the base or vertical member of the clip so as to prevent any possible disengagement or slipping of the stop on the bar. When the locking device is not required for immediate service its forward end is moved outward against the side of the car so as to be out of the way, thereby clearing the levers 3 and 4 so as not to interfere with their free use in the accustomed way. When it is required to lock the vehicle the brake lever 3 is moved so as to firmly set the brakes and the clutch lever 4 occupies a neutral position. The forward portion of the bar 5 is moved laterally to project the stop 10 into the path of the lever 3 and to bring its slotted end 7 adjacent the lever 4 after which the pad lock 8 is adapted so as to engage the lever 4 and the slotted end 7 of the bar 5, thereby preventing movement of the vehicle, because the wheels are chocked by means of the brake and the clutch lever is prevented from movement to throw the motor into gear, hence the vehicle may not be moved either by its own motive power or by other power applied thereto in an attempt to carry off the same.

The foregoing description and the drawing has reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a vehicle having front and rear controlling levers, a bar pivoted to the vehicle at its rear end and having its front end slotted and having a portion of one side toothed, a stop provided with a clip having a toothed portion to coact with the teeth of the bar and means for securing the stop to the bar in the required adjusted position, the bar being disposed so that the stop will engage the rear lever when moved to a set position and its forward slotted end receive the hasp of a pad lock applied to the front lever.

In testimony whereof I affix my signature in presence of two witnesses.

EVERETT STIGLEMAN.

Witnesses:
 WILLIAM MATHEWS,
 CHARLES STIGLEMAN.